W. DIXSON & B. W. RECORDS.
Sawing-Machine.

No. 200,899. Patented March 5, 1878.

Witnesses:
Donn J. Twitchell
Will W. Dodge

Inventor:
Witty Dixson
B. W. Records
By their attys.
Dodgeson

UNITED STATES PATENT OFFICE.

WESTLY DIXSON AND BENJAMINE W. RECORDS, OF WALTON, KENTUCKY.

IMPROVEMENT IN SAWING-MACHINES.

Specification forming part of Letters Patent No. 200,899, dated March 5, 1878; application filed December 21, 1877.

*To all whom it may concern:*

Be it known that we, WESTLY DIXSON and BENJAMINE W. RECORDS, of Walton, in the county of Boone and State of Kentucky, have invented certain Improvements in Crosscut-Sawing Machines, of which the following is a specification:

Our invention relates to that class of portable crosscut-sawing machines which are used mainly for cutting logs and timber into shorter lengths, and which are ordinarily driven by manual power; and the invention consists in various improvements in the construction, hereinafter explained in detail.

Figure 1:
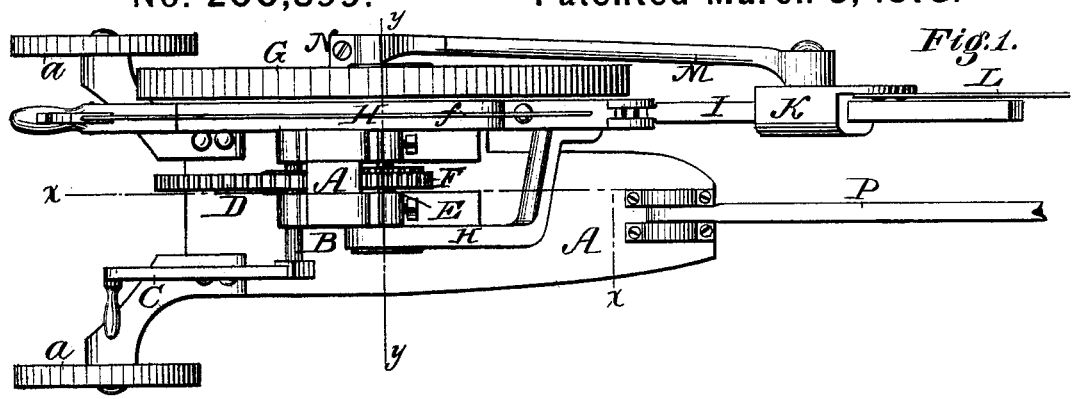
Figure 2:
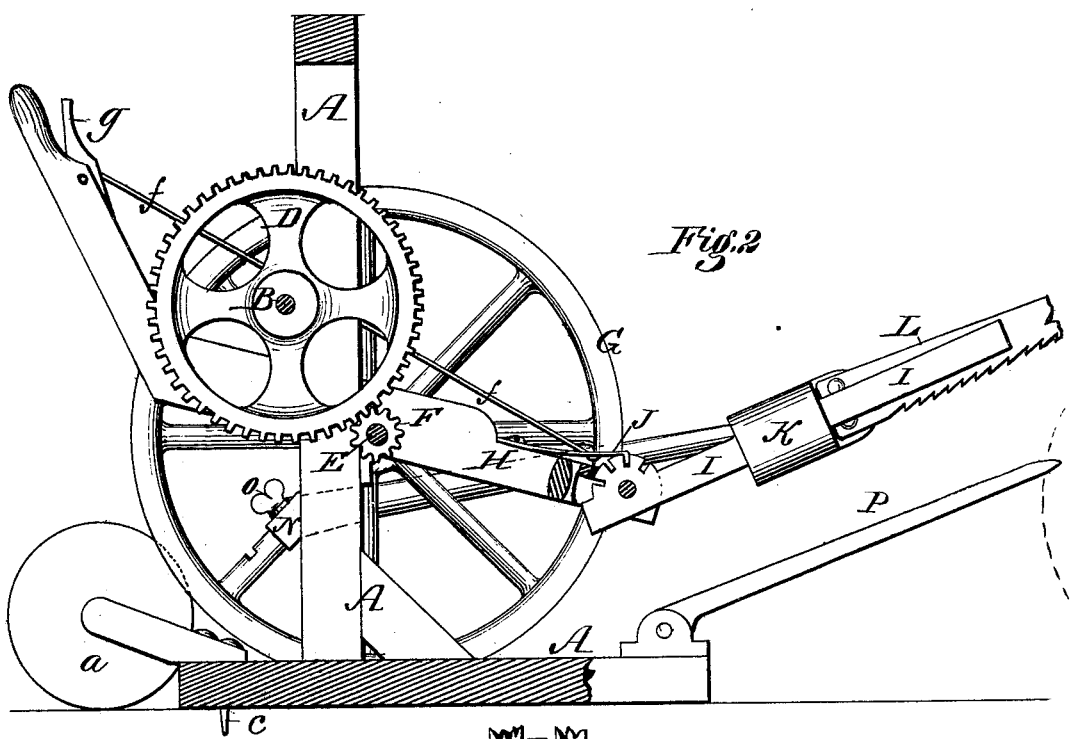
Figure 3:
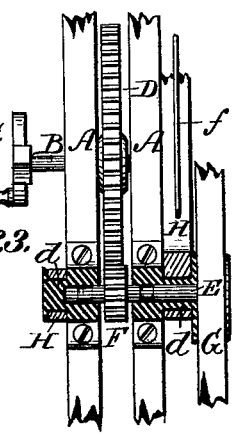

Figure 1 represents a top-plan view of our machine; Fig. 2, a vertical section of the same on the line $x\ x$, Fig. 1; Fig. 3, a vertical section on the line $y\ y$, Fig. 1.

A represents the frame of the machine, consisting of a flat base, provided with uprights to sustain the shaft-bearings. The base-frame rests flatly and solidly upon the ground when the machine is in action; but at its rear end it is provided with two wheels, $a$, upon which the machine may be easily trundled about by lifting the front end of the frame in the hands.

In order to prevent the shifting of the machine, the base of the frame is provided with pins or studs $c$, to enter the ground, the pins being, of course, withdrawn from the ground by the act of raising the frame, so that they do not interfere with the moving of the machine from place to place. On the upright portion of the frame there is mounted, in suitable bearings, a driving-shaft, B, provided with an operating-crank, C, and a gear-wheel, D. A second shaft, E, is also mounted on the frame, below the one above mentioned, and provided with a pinion, F, gearing into the driving-wheel D, and with a large fly-wheel, G, as shown.

Each of the boxes or bearings in which the shaft E is mounted is provided with an outwardly-extending sleeve, $d$, as shown in Fig. 3, and on these sleeves there are mounted the arms of a rocking frame, H, which is provided with an adjusting arm or lever, extending backward in such position that it may be reached by the operator standing at the crank C. To the forward end of the rocking frame H there is connected, by a horizontal pivot, a guide-bar, I, which has its pivoted end provided with a notched head, and locked rigidly to the frame H by a spring-catch, J, on said frame. The catch J is connected by a rod, $f$, with a small latch or lever, $g$, on the tilting arm or lever of frame H, as shown, so that the attendant may, with one hand, rock the frame H and release the guide-bar I from the catch J. On the guide-bar I there is mounted a sliding head, K, to which a saw-blade, L, is rigidly secured, as shown. The sliding head K is connected by a pitman, M, with a pivot on a block, N, which latter is mounted on one of the arms or spokes of the fly-wheel, and secured by means of a thumb-screw, O.

In operating the machine, the attendant turns the crank, and thereby causes the gearing and pitman to move the saw-carrying head back and forth on the guide-bar. The frame H, being free to rock on the supporting-sleeves, permits the guide and saw to fall of their own weight as the latter cuts its way into the log; or, if desired, a downward pressure may be applied to the saw by pushing upward on the arm of frame H. As the saw, in descending, assumes a downward inclination toward its point, the frame H is tipped to raise the heel of the guide-bar, and the catch unlocked to permit the guide and saw to fall to a horizontal position, after which the catch is again permitted to lock the bar and frame together until the saw is again inclined, when the adjustment is repeated. In this way the saw is maintained in a practically horizontal position during its entire operation, and permitted to cut without difficulty from highly-elevated points down to the ground. By adjusting the block to which the pitman is pivoted radially upon the spoke of the fly-wheel, the length of movement of the saw may be readily increased and diminished, as desired. In order to prevent the block from being loosened by the vibration of the parts, the spoke on which the block is mounted is made angular, and provided with notches to receive the fastening-screw.

In order to maintain a close connection of the pitman, it should be provided at one end with a conical wrist to enter the sliding block, and at the other end with a divided head, embracing a spherical wrist or pivot, and at each end a set-screw should be provided for drawing the parts together. At its front end the main frame is provided with a pivoted arm, P, which may be engaged against the log to prevent the same from moving under the action of the saw.

By our method of constructing the machine, it is rendered extremely simple and light, and adapted for operation in an easy and convenient manner.

The hanging of the saw-carrying frame on the boxes of and concentric with the driving-shaft, so that the saw can rise and fall without changing its relation to the driving mechanism, the jointing of the saw-guide to the rocking frame, and the other details connected therewith, are all of decided benefit to the machine.

Having described our invention, what we claim is—

1. The combination of the main frame and the gearing therein, the rocking frame H, provided with the saw-guide and the backwardly-extending arm, the sliding saw-carrying head, and the pitman, constructed and arranged as shown.

2. In a wood-sawing machine, the boxes of the main crank-shaft E, provided with the wrist or extensions $d$, having the saw-sustaining frame mounted thereon, as shown.

3. In combination with the rocking frame H, having the rear arm or lever, and the saw-guide jointed to the forward end of said frame, the catch J, connected with the operating device $g$ on the rear arm of the frame, as shown.

WESTLY DIXSON.
BENJAMINE W. RECORDS.

Witnesses:
GEORGE W. HOLDEN,
ALBION SMITH.